US008695659B2

(12) United States Patent
Hitotsuyanagi

(10) Patent No.: US 8,695,659 B2
(45) Date of Patent: Apr. 15, 2014

(54) PNEUMATIC TIRE HAVING FIRST TYPE SIPE AND SECOND TYPE SIPE

(75) Inventor: Tomohiro Hitotsuyanagi, Osaka (JP)

(73) Assignee: Toyo Tire & Rubber Co, Ltd., Osaka (JP)

( * ) Notice: Subject to any disclaimer, the term of this patent is extended or adjusted under 35 U.S.C. 154(b) by 776 days.

(21) Appl. No.: 12/907,142

(22) Filed: Oct. 19, 2010

(65) Prior Publication Data

US 2011/0126951 A1 Jun. 2, 2011

(30) Foreign Application Priority Data

Dec. 2, 2009 (JP) ................. 2009-274754

(51) Int. Cl.
*B60C 11/12* (2006.01)
(52) U.S. Cl.
USPC ................. 152/209.21; 152/DIG. 3
(58) Field of Classification Search
USPC ...................... 152/209.21, DIG. 3
See application file for complete search history.

(56) References Cited

FOREIGN PATENT DOCUMENTS

| EP | 213452 A2 | * | 3/1987 |
| JP | 2000-102925 A | * | 4/2000 |
| JP | 2000211321 A | | 8/2000 |
| JP | 2003-205710 A | * | 7/2003 |
| JP | 2003182313 A | | 7/2003 |

OTHER PUBLICATIONS

Machine translation JP 2000-102925 (no date).*
Machine translation for Europe 213452 (no date).*
Machine translation for Japan 2003-205710 (no date).*

* cited by examiner

*Primary Examiner* — Steven D Maki
(74) *Attorney, Agent, or Firm* — Fish & Richardson P.C.

(57) ABSTRACT

An object of the present invention is to provide a pneumatic tire which prevents not only partial wear but also clack generation in land portion of tread surface. In order to achieve the object, the land portion is formed with a first type sipe having a step portion extending in a width direction of the tire on one sipe wall surface and a second type sipe having a step portion extending in the width direction of the tire on a sipe wall surface facing in the opposite direction of the first type sipe as viewed in the circumferential direction of the tire.

2 Claims, 5 Drawing Sheets

A

B

C

PNEUMATIC TIRE HAVING FIRST TYPE SIPE AND SECOND TYPE SIPE

BACKGROUND OF THE INVENTION

1. Field of the Invention

The present invention relates to a pneumatic tire comprising a tread surface including a land portion defined by a main groove extending in a circumferential direction of the tire. The pneumatic tire of the present invention is particularly useful for a heavy duty pneumatic tire.

2. Description of the Related Art

In heavy duty pneumatic tires used for trucks and buses, repeated use may cause partial wear generated notably in shoulder portion on land portion. For example, in the case of tires having blocks formed as land portion in shoulder portion, partial wear tends to be generated in a side edge portion and a trailing side portion of the block (shadowed in FIG. 8). Therefore, in heavy duty pneumatic tires, there is a problem of a partial wear, so-called heel and toe wear or the like; that is, a wear difference is generated in the trailing side and the leading side of the block as viewed in a circumferential direction of the tire.

The inventor of the present invention focused its interest on the following technique as means for preventing partial wear of the land portion including blocks. That is, a wear sacrifice portion is provided by forming sipes in a side edge portion of the land portion in order to locally reduce the stiffness of the land portion. In this case, the wear energy is concentrated on the sacrifice portion. Therefore, the wear energy is reduced at the trailing side, and thus the heel and toe wear is prevented from being generated in the entire of the land portion. However, in order to concentrate the wear energy, the stiffness of the land portion between the sipes has to be reduced by increasing the volume of sipes. Accordingly, clacks may be generated starting at the bottom of the sipe, and then it may lead to a break of land portion.

Patent document 1 (Japanese Unexamined Patent Publication No. 2000-211321) teaches a pneumatic tire described below. That is, in the sipe formed in the block of the tread surface, the width of the sipe is formed to be narrower at the bottom side than at the tread side and sipe wall surface located at the trailing side is formed in a step-like shape. This pneumatic tire employs in particular both-side open sipes which have openings at both sides of block in order to increase snow/water ejecting performance. However, this tire is formed with sipes in the entire area of the block as viewed in the width direction thereof, but no wear sacrifice portion is formed for absorbing local wear that is generated locally in the block. Therefore, the entire of the block is not prevented satisfactorily from being generated with heel and toe wear. Further, since sipes are formed in the entire area of the block as viewed in the width direction, small blocks formed between the sipes have extremely reduced stiffness and clacks are easily generated.

Patent document 2 (Japanese Unexamined Patent Publication No. 2003-182313) teaches a pneumatic tire as described below. That is, the tire is formed with sipes in a block of tread surface, and a step portion is formed on wall of small block formed between the sipes; thereby, compared to the thickness at the base side of the small block, the thickness at the tread side of the small block is formed to be thinner. In this pneumatic tire, in particular both side open sipes are employed in order to increase on-ice traction performance and on-snow traction performance. However, same as the pneumatic tire set forth in Japanese Unexamined Patent Publication No. 2000-211321, sipes are formed in full width direction of the block. But no wear sacrifice portion is formed for absorbing local wear that is generated locally in the block. Therefore, the entire of the block is not prevented satisfactorily from being generated with heel and toe wear. Further, since sipes are formed in the entire area of the block as viewed in the width direction, small blocks formed between the sipes have extremely reduced stiffness and clacks are easily generated.

Patent document 1; Japanese Unexamined Patent Publication No. 2000-211321

Patent document 2; Japanese Unexamined Patent Publication No. 2003-182313

SUMMARY OF THE INVENTION

The present invention has been proposed in view of the above circumstances. An object of the present invention is to provide a pneumatic tire which prevents not only partial wear but also clack generation in land portion of tread surface.

In order to achieve the above object, the inventor of the present invention examined intensively a method for forming wear sacrifice portion in the land portion from an earlier stage of use of the tire. As a result, it was found that, by forming one-side closed sipes in the side edge portion of the land portion to make a large stiffness difference between the sipe wall surface located at the trailing side and the sipe wall surface located at the leading side, heel and toe wear is intentionally generated in the land portion between the sipes; thereby wear sacrifice portion can be formed in an early stage of use of the tire. The present invention has been made based on the above examination, and with the arrangement below, the above object can be achieved.

That is, the pneumatic tire of the present invention comprises a tread surface including a land portion defined by a main groove extending in a circumferential direction of the tire, wherein the land portion is formed with a first type sipe having a step portion extending in a width direction of the tire on one sipe wall surface and a second type sipe having a step portion extending in the width direction of the tire on a sipe wall surface facing in the opposite direction of the first type sipe as viewed in the circumferential direction of the tire, each of the first type sipe and the second type sipe is formed as one-side closed sipe extending in the width direction of the tire; and by forming the step portion, the width of the sipe perpendicular to the longitudinal direction of the sipe is formed to be narrower at the bottom side of the sipe than the that of the tread surface side.

When the above pneumatic tire is mounted on a vehicle, irrespective of the direction of the mounted tire, either of the first type sipes or the second type sipes has a step portion on the sipe wall surface located at the leading side. In such sipes, compared to sipe wall surface with the step portion located at the leading side, the sipe wall surface with no step portion located at the trailing side has a lower stiffness. In this pneumatic tire, the first type sipes and the second type sipes are formed in one-side closed sipes. In the side edge portion of the land portion, in the circumferential direction, the stiffness difference is increased in the land portion between the sipes. In this portion, the heel and toe wear is generated from the earlier stage of use of the tire. With this arrangement, irrespective of the direction of the mounted tire, in the side edge portion of the land portion, the wear sacrifice portion is formed in an earlier stage; thereby heel and toe wear can be prevented from expanding into the entire of the land portion. Also, by providing the above-described step portion, even when the volume of the first/second type sipes as the one-side closed sipes is reduced, a stiffness difference can be made large in the circumferential direction in the land portion between the sipes. As a result, as described above, while preventing the partial wear from being generated, clack generation due to the sipe can be prevented.

In the pneumatic tire, it is preferred that the tread surface is formed with a lateral groove crossing the main groove, each of the first type sipe closest to the lateral groove and the second type sipe closest to the lateral groove has the step portion on the sipe wall surface located at the lateral groove side. With this arrangement, in the sipe closest to the lateral groove, the stiffness of the sipe wall surface located at the lateral groove side is increased. Therefore, the stiffness of the land portion between the sipe and the lateral groove is increased. As a result, in this pneumatic tire, clacks can be prevented from being generated at end portion of the land portion.

In the pneumatic tire, it is preferred that each of the first type sipe and the second type sipe has a concave portion in the sipe wall surface located at the side where the step portion is not formed. With this arrangement, since the stiffness of the sipe wall surface with no step portion is further reduced, the stiffness difference is made larger in the land portion between the sipes in the circumferential direction. As a result, in this pneumatic tire, the heel and toe wear can be effectively prevented from expanding into the entire of the land portion.

DETAILED DESCRIPTION OF THE PREFERRED EMBODIMENTS

Figure 1:
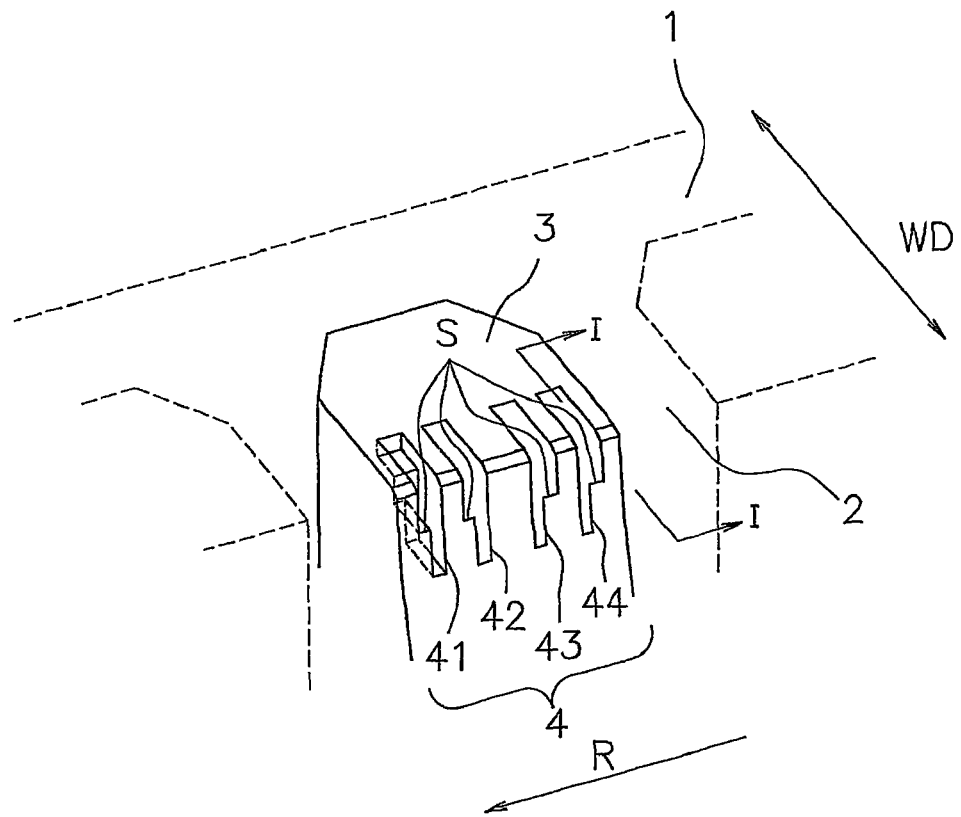
FIG. 1 is a partially enlarged view of an example of a land portion of a pneumatic tire according to the present invention.
Figure 2:
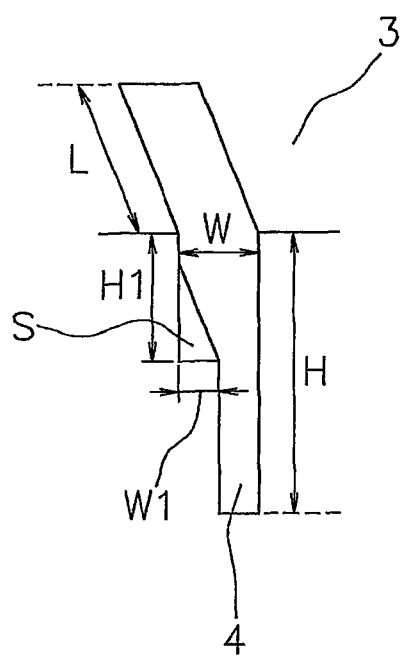
FIG. 2 is a partially enlarged view of an example of a sipe according to the present invention.
Figure 3:
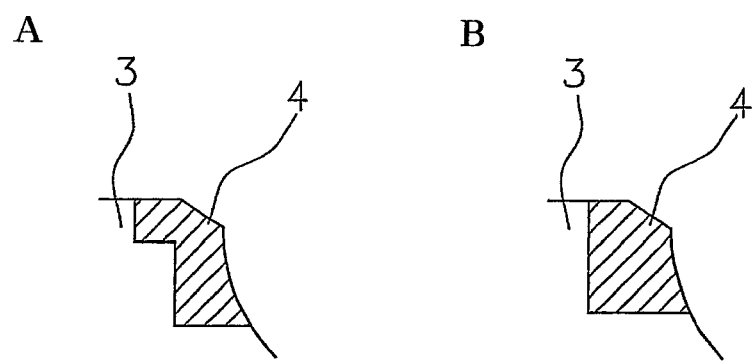
FIG. 3A is a sectional view taken along line I-I in FIG. 1.
FIG. 3B shows a sipe wall surface of Comparative Example 1.

Embodiments of the present invention will be described below. FIG. 1 is a partially enlarged view of an example of a land portion of a pneumatic tire according to the present invention. FIG. 2 is a partially enlarged view of an example of a sipe according to the present invention. FIG. 3A is a sectional view taken along line I-I in FIG. 1. In FIG. 1, reference symbol R indicates a circumferential direction as well as a rotation direction of the tire; and reference symbol WD indicates a width direction of the tire.

As shown in FIG. 1, the pneumatic tire according to the present embodiment includes a block 3 as a land portion which is defined by a main groove 1 and a lateral groove 2. FIG. 1 particularly shows a block 3 which is disposed in a shoulder portion (in FIG. 1, the lower side is the outer site of the tire as viewed in the width direction thereof.) In the present invention, in addition to the blocks, ribs may be included in the tread surface of the tire as the land portion.

In the block 3, a plurality of one-side closed sipes 4 is formed extending in the width direction WD of the tire. As shown in FIG. 2, each of the one-side closed sipes 4 has a step portion S; thereby a sipe width W perpendicular to the longitudinal direction of the sipe is formed to be narrower at the bottom side than the tread surface side of the sipe. In this embodiment, the one-side closed sipes 4 have two different type sipes; that is, first type sipes 41 and 42 each having a step portion S extending in the width direction WD of the tire on the sipe wall surface located at the leading side, and second type sipes 43 and 44 each having a step portion S extending in the width direction WD of the tire on the sipe wall surface located at the trailing side.

In the tire according to the present embodiment mounted in the direction shown in FIG. 1, each of the first type sipes 41 and 42 has the step portion S on the sipe wall surface located at the leading side. In the first type sipes 41 and 42, compared to the sipe wall surface located at the leading side having the step portion S, the sipe wall surface located at the trailing side having no step portion S has a lower stiffness. With this arrangement, in a shoulder end portion of the block 3, a stiffness difference is made large in the circumferential direction of the tire in a small block defined by two first tyre sipes 41 and 42. Since the first type sipes 41 and 42 are formed as one-side closed sipes 4, in the block 3, particularly in the shoulder end portion formed with first type sipes 41 and 42, the heel and toe wear is generated in an early stage of use, and this portion functions as the sacrifice portion. As a result, the heel and toe wear can be prevented from extending into the entire of the block 3.

On the other hand, when the tire is mounted in the direction opposite to the direction shown in FIG. 1 (the rotation direction is opposite to the direction of the arrow R in FIG. 1), each of the second type sipes 43 and 44 has step portion S on the sipe wall surface located at the leading side. With this arrangement, in a shoulder end portion of the block 3, a stiffness difference is made large in the circumferential direction of the tire in a small block defined by two second type sipes 43 and 44. Since each of the second type sipes 43 and 44 is formed as one-side closed sipe 4, in the block 3, particularly in the shoulder end portion formed with second type sipes 43 and 44, the heel and toe wear is generated in an early stage of use, and this portion functions as the sacrifice portion. As a result, irrespective of direction of the mounted pneumatic tire the heel and toe wear can be prevented from extending into the entire of the block 3.

In this embodiment, in the block 3, the one-side closed sipes 4 includes two different type sipes; that is, first type sipes (two) each having the step portion S on the sipe wall surface located at the leading side, and second type sipes (two) each having the step portion S on the sipe wall surface located at the trailing side. When the same number of different type of sipes are formed in one block; that is, the number of first type sipes each having the step portion S on the sipe wall surface located at the leading side is the same as second type sipes each having the step portion S on the sipe wall surface located at the trailing side, the partial wear can be effectively prevented preferably irrespective of the direction of the mounted tire.

Also, by forming the step portion S, even when the volume of the first type sipes 41 and 42 and second type sipes 43 and 44 as the one-side closed sipe 4 is reduced, a stiffness difference can be made large in the block between the sipes in the circumferential direction of the tire. As a result, while preventing generation of the partial wear, generation of clacks due to the sipe can be prevented. In order to prevent the clacks due to the sipe, it is preferred to form the area of the sipe wall surface as small as possible as shown in FIG. 3A. More particularly, sire depth H of the one-side closed sipe 4 is preferably 25 mm or less, the length L of the sipe is preferably 8 mm or less, and sipe width W thereof is preferably 2 mm or less. In order to further increase the preventive effect of the partial wear, depth H1 from the tread of the block 3 to the step portion S is preferably 30 to 70% of the sipe depth H. Also, width W1 of the step portion S is preferably 1.5 mm or less.

According to the present embodiment, each of the first type sipe 41 and the second type sipe 44 both of which are located closest to the lateral groove 2 has the stop portion S on the sipe wall surface located at the lateral groove 2 side. In this case, in the first type sipe 41 and the second type sipe 44, the stiffness of the sipe wall surface located at the lateral groove 2 side is increased by the step portion S. The stiffness of the small block between the first type sipes 41 (the second type sipes 44) and the lateral groove 2 is increased. As a result, break of the block due to the clacks generated at the block end portion can be prevented.

The pneumatic tire according to the present invention is the same as ordinal pneumatic tires excepting a point that the one-side closed sipes are formed in the side edge portion of the land portion, and each of the sipes has the step portion on the sipe wall surface. Therefore, any of the conventionally known materials, shapes, structures and manufacturing methods is applicable to the present invention.

The pneumatic tire according to the present invention provides the working effect as describe above. Since both of the partial wear on land portion of the tread surface and clack generation can be prevented. Therefore, the pneumatic tire according to the present invention is useful as heavy duty pneumatic tire used for trucks and buses.

[Other Embodiments]

(1) The above embodiment has shown an example in which total 4 one-side closed sipes are formed in one block. That is, two first type sipes each having the step portion S on the sipe wall surface located at the leading side; and two second type sipes each having the step portion S on the sipe wall surface located at the trailing side. However, in the present invention, 2 to 6 one-side closed sipes may be formed in one block. Also, in order to obtain partial wear preventive effect irrespective of direction of the mounted tire, it is preferred to form the same number of first type sipes each having the step portion S on the sipe wall surface located at the leading side and second type sipes each having the step portion S on the sipe wall surface located at the trailing side. However, within a range that partial wear preventive effect is not degraded, the number of the first type sipes and the second type sipes may be varied in one block.

(2) The above embodiment has shown an example in which one-side closed sipes 4 are formed in the shoulder end portion of the block 3 disposed in the shoulder portion of the tire as the land portion thereof. However, in the present invention, the one-side closed sipes may be formed in a side edge portion of a block disposed in the tread surface other than the shoulder portion. Also, the one-side closed sipes may be formed in side edge portion not only in the block but also in a rib defined by the main groove. In this case, river wear can be prevented from being generated in the side edge portion of the rib. When on-side closed sipes are formed in the side edge portion of the rib, in one pitch of the rib which is obtained by divided the length in the circumferential direction of the tire by a predetermined pitch length, the first type sipes and the second type sipes may be formed. Also, it is preferred to form the same number of the first type sipes and the second type sipes in one pitch of the rib.

Figure 4:
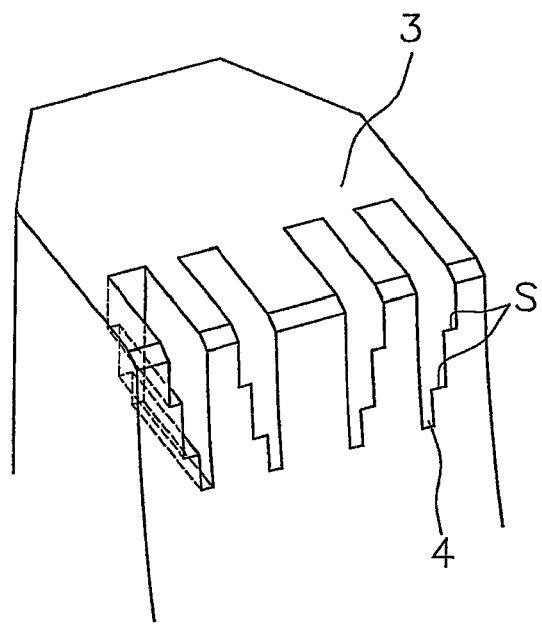
FIG. 4 is a partially enlarged view of another example of a land portion of the pneumatic tire according to the present invention.

(3) The above embodiment has shown an example in which each of the one-side closed sipes 4 has one step portion S on the sipe wall surface. However, in the present invention, two step portions S or three or more step portions S may be formed as shown in FIG. 4. When the each of the one-side closed sipes 4 has a plurality of step portions S on the sipe wall surface, even when the wear progresses as the tire use, the stiffness difference can be maintained in the circumferential direction of the small block defined by one-side closed sipes 4. As a result, the partial wear preventive effect can be continuously obtained from earlier stage of use of the tire.

Figure 5:
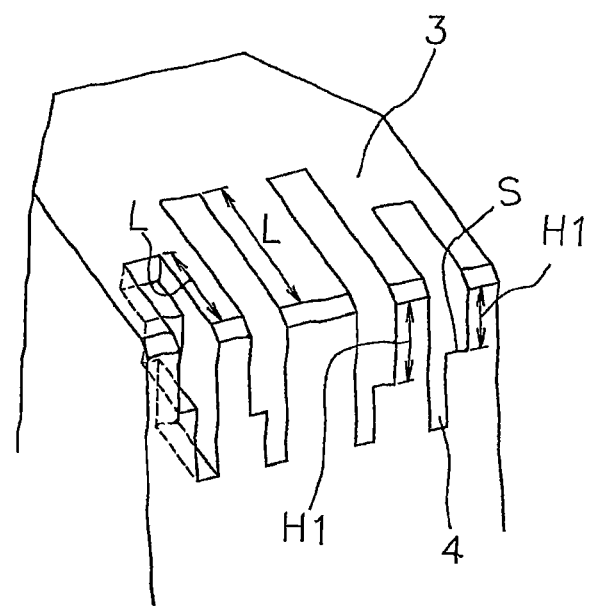
FIG. 5 is a partially enlarged view of another example of a land portion of the pneumatic tire according to the present invention.

(4) The above embodiment has shown an example in which, in all one-side closed sipes 4 formed in one block, depth H1 from the tread to the step portion S of the block 3 is the same with respect to the sipe depth H. However, in the present invention, H1 of each of the one-side closed sipes 4 may be different from each other in one block as shown in FIG. 5. In this case, even when the wear proceeds as use of the tire, the stiffness difference in the circumferential direction of small blocks defined by one-side closed sipes 4 having a large H1 can be maintained. Therefore, the partial wear preventive effect can be continuously obtained from earlier stage of use of the tire. Further, H1 of the one-side closed sipes 4 at the block end side is preferably formed to be smaller than H1 of the one-side closed sipe 4 at the center. In this case, the stiffness at the block end is increased and the block is hardly broken.

(5) The above embodiment has shown an example in which, in all one-side closed sipes 4 formed in one block, the length L of the sipes is arranged to be identical to each other. However, in the present invention it may be arranged so that the length of the one-side closed sipes 4 located at the closest to the lateral grooves is shorter than that of the one-side closed sipes 4 located at the inner side as viewed in the circumferential direction of the tire as shown in FIG. 5. In this case, in the block located in the inner side as viewed in the circumferential direction of the tire, while the stiffness difference as viewed in the circumferential direction in a small block defined by the one-side closed sipes 4 can be made large, the stiffness of the sipe wall surface located at the lateral groove side can be increased. With this arrangement, while maintaining the partial wear preventive effect, the break of the block due to a clack generated at the block end portion can be prevented more effectively.

Figure 6:
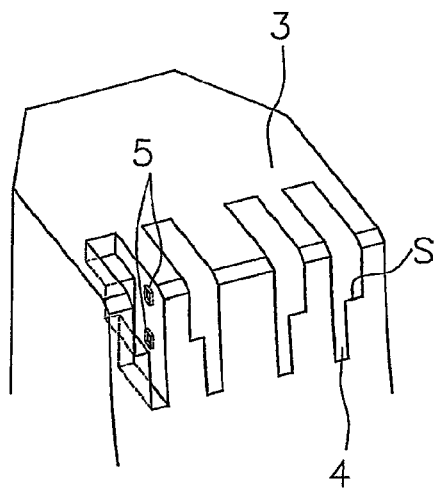
FIGS. 6A to 6C are partially enlarged views each showing a land portion of the pneumatic tire according to the present invention.
Figure 6:
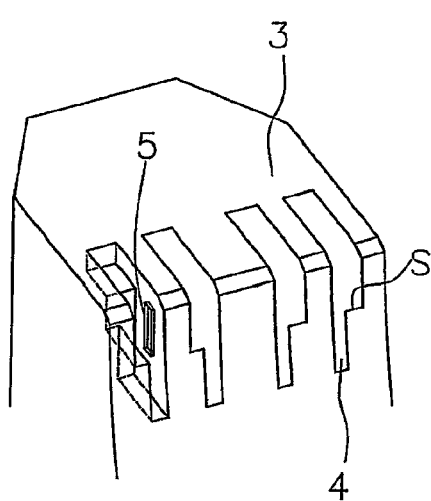
Figure 6:
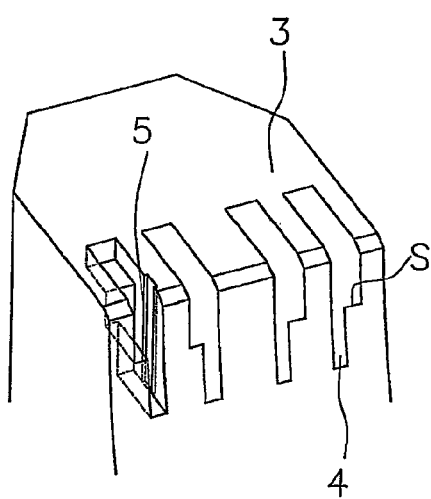

(6) The above embodiment has shown an example in which, in one-side closed sipes 4, the sipe wall surfaces with no step portion S are formed in a plane. However, in the present invention, in the one-side closed sipes 4, the sipe wall surfaces with no step portion S may be formed with a concave portion 5 as shown in FIGS. 6A to 6C. With this arrangement, the stiffness of the sipe wall surface with no step portion S is further reduced. Therefore, the stiffness difference in the circumferential direction of the land portion between the sipes is made larger. As a result, in this pneumatic tire, the heel and toe wear can be prevented more effectively from being expanded into the entire of the block.

EXAMPLES

Examples for particularly demonstrating the structure and working of the present invention will be described. Evaluation items in the Examples were measured as described below.

(1) Partial Wear (Heel and Toe Wear)

After mounting a tire of 11R22.5 14PR onto a rim of 22.5×7.50, filling the tire with the air to inner pressure 700 kPa. Then, the tire was mounted to an actual vehicle as a leading tire (a large truck of vehicle, total weight of 20 t). Under a load condition of 80% of maximum loading capacity, after running on a pavement surface up to a predetermined traveling distance (about 40,000 km), wear difference between the leading side and the trailing side was measured in the shoulder block.

(2) Anti-Clack Performance

After mounting a tire of 11R22.5 14PR onto a rim of 22.5×7.50, filling the tire with the air to inner pressure 700 kPa. Then, the tire was mounted to an actual vehicle as a leading tire (a large truck of vehicle total weight of 20 t). Under a load condition of 80% of maximum loading capacity, after running on a pavement surface up to a predetermined traveling distance (about 40,000 km), visually check was made for clacks generated in the tread side of the shoulder block and the side edge portion of the blocks. When a large clack (break of block) is found: "x", when a small clack which affects little on tire use is found: "Δ", when no clack is found: "○".

Example 1

A pneumatic tire including a shoulder block shown in FIG. 1 was prepared (one-side closed sipes 4 shown in FIG. 2 and FIG. 3A were formed and the following settings were made: L=5 mm, H=20 mm, W=1 mm, H1=10 mm, W1=0.5 mm). Table 1 shows the result of the above evaluation made by using such a pneumatic tire.

Example 2

Figure 7:
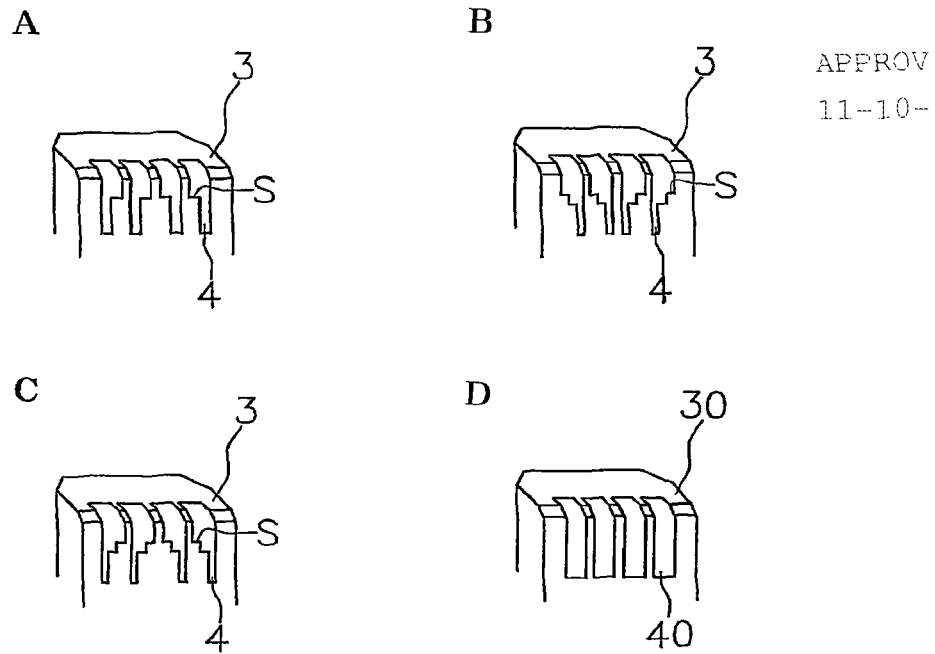
FIGS. 7A to 7D are partially enlarged views each showing a land portion of the pneumatic tire of Examples and Comparative Examples.
Figure 8:
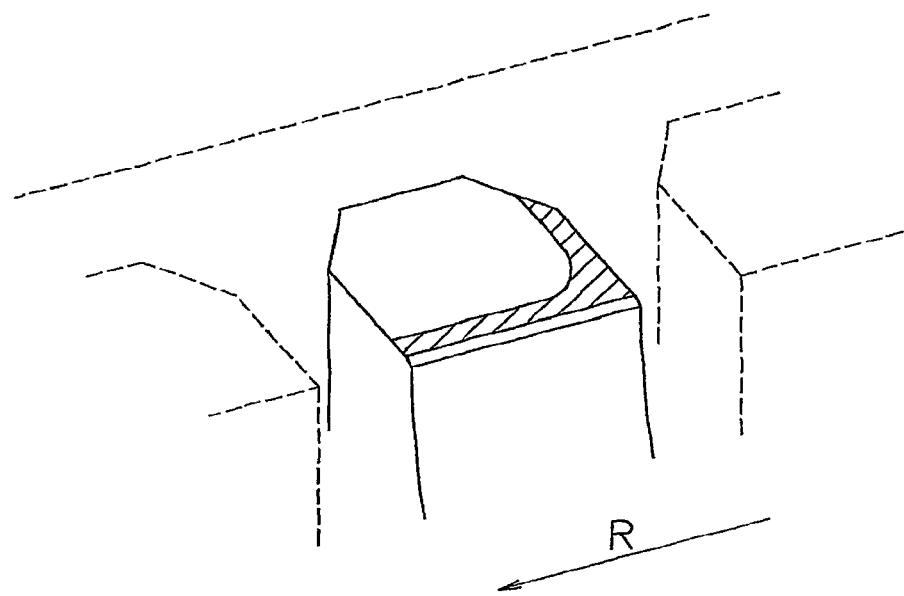
FIG. 8 shows a tendency of partial wear of a conventional pneumatic tire.

A following pneumatic tire was prepared. That is, a pneumatic tire which had the same structure as that in Example 1 excepting a point that, in the pneumatic tire including shoulder block shown in FIG. 1, the direction of the sipe wall surface with the step portion S was changed as shown in FIG. 7A. Table 1 shows the result of the above evaluation made by using such a pneumatic tire.

Example 3

A following pneumatic tire was prepared. That is, a pneumatic tire which had the same structure as that in Example 1 excepting a point that, in the pneumatic tire including shoulder block shown in FIG. 1, one-side closed sipes 4 which had two step portions S as shown in FIG. 7B employed. Table 1 shows the result of the above evaluation made by using such a pneumatic tire.

Example 4

A following pneumatic tire was prepared. That is, a pneumatic tire which had the same structure as that in Example 3 excepting a point that, the direction of the sipe wall surface with the step portions S was changed as shown in FIG. 7c. Table 1 shows the result of the above evaluation made by using such a pneumatic tire.

Example 5

A following pneumatic tire was prepared. That is, a pneumatic tire which had the same structure as that in Example 1 excepting a point that, two concave portions 5 shown in FIG. 6A were formed on the sipe wall surface with no step portion S in the first type sipes and the second type sipes (concave depth: 1.0 mm, size of sipe wall surface: 3.0 mm×3.0 mm). Table 1 shows the result of the above evaluation made by using such a pneumatic tire.

Comparative Example 1

A following pneumatic tire was prepared. That is, a pneumatic tire had the same structure as that in Example 1 excepting a point that, in the pneumatic tire including shoulder block shown in FIG. 1, sipe wall surface shown in FIG. 3B with no step portion S was formed. Table 1 shows the result of the above evaluation made by using such a pneumatic tire.

Comparative Example 2

A following pneumatic tire was prepared. That is, a pneumatic tire had the same structure as that in Example 1 excepting a point that, in the pneumatic tire including shoulder block shown in FIG. 1, sipe wall surface shown in FIG. 3A with no step portion S was formed. Table 1 shows the result of the above evaluation made by using such a pneumatic tire.

TABLE 1

|  | Comparative Example 1 | Comparative Example 2 | Example 1 | Example 2 | Example 3 | Example 4 | Example 5 |
| --- | --- | --- | --- | --- | --- | --- | --- |
| Amount of wear difference in shoulder block | 0.5 mm | 2 mm | 0.5 mm | 0.5 mm | 0.5 mm | 0.5 mm | 0.3 mm |
| Clack preventive effect (side edge) | X | Δ | ○ | Δ | ○ | Δ | ○ |
| Clack preventive effect (tread surface side) | X | Δ | ○ | Δ | ○ | Δ | ○ |

As is apparent from Table 1, in the pneumatic tires of Examples 1 to 5, wear difference amount between the trailing side and the leading side of the shoulder block was small and thus, the partial wear was prevented. Also, in the pneumatic tires of Examples 1 to 5, no clack or only small clacks were generated. In Example 1 and Example 3, since no clack was generated, the pneumatic tires are superior in, in particular, anti-clack performance when the first type sipe and the second type sipe closest to the lateral groove have step portion on the sipe wall surface located at the lateral groove side. On the other hand, in the Comparative Example 1, since the sipes had a large volume, although the partial wear preventive effect was obtained, a large clack was generated. In the Comparative Example 2, only small clacks were generated. Since the stiffness difference in the circumferential direction of small block between the sipes was small, the function as the wear sacrifice portion was not satisfactorily obtained, and thus partial wear was not prevented.

What is claimed is:

1. A pneumatic tire, comprising a tread surface including a land portion defined by a main groove extending in a circumferential direction of the tire, wherein the land portion is formed with a first type sipe having a step portion extending in a width direction of the tire on one sipe wall surface and a second type sipe having a step portion extending in the width direction of the tire on a sipe wall surface facing in the opposite direction of the first type sipe as viewed in the circumferential direction of the tire, each of the first type sipe and the second type sipe is formed as a one-side closed sipe extending in the width direction of the tire; and by forming the step portion, the width of the sipe perpendicular to the longitudinal direction of the sipe is formed to be narrower at the bottom side of the sipe than the width is at the tread surface side, and wherein each of the first type sipe and the second type sipe has a concave portion in the sipe wall surface located at the side where the step portion is not formed.

2. The pneumatic tire according to claim 1, wherein the tread surface is formed with a pair of lateral grooves crossing the main groove, each of the first type sipe has the step portion on the sipe wall closest to a first one of the lateral grooves and each of the second type sipe has the step portion on the sipe wall closest to a second one of the lateral grooves.

* * * * *